(12) United States Patent
Slaney-Smith et al.

(10) Patent No.: US 12,112,608 B2
(45) Date of Patent: Oct. 8, 2024

(54) ASSET CONTROL SYSTEM

(71) Applicant: E TRACK LTD, West Midlands (GB)

(72) Inventors: Adam Slaney-Smith, West Midlands (GB); David Woodfield, West Midlands (GB)

(73) Assignee: E TRACK LTD, West Midlands (GB)

( * ) Notice: Subject to any disclaimer, the term of this patent is extended or adjusted under 35 U.S.C. 154(b) by 72 days.

(21) Appl. No.: 17/788,467

(22) PCT Filed: Dec. 23, 2020

(86) PCT No.: PCT/EP2020/087833
§ 371 (c)(1),
(2) Date: Jun. 23, 2022

(87) PCT Pub. No.: WO2021/130346
PCT Pub. Date: Jul. 1, 2021

(65) Prior Publication Data
US 2023/0020085 A1    Jan. 19, 2023

(30) Foreign Application Priority Data
Dec. 23, 2019  (GB) ..................... 1919132

(51) Int. Cl.
*G08B 13/24*   (2006.01)
*G06K 19/07*   (2006.01)

(52) U.S. Cl.
CPC ..... *G08B 13/2462* (2013.01); *G06K 19/0723* (2013.01)

(58) Field of Classification Search
CPC .......................... G08B 13/2462; G06K 19/0723
(Continued)

(56) References Cited

U.S. PATENT DOCUMENTS

| | | | | |
|---|---|---|---|---|
| 4,673,915 A | * | 6/1987 | Cobb | ................. G08B 5/22 340/568.1 |
| 2001/0006368 A1 | * | 7/2001 | Maloney | ............. G08B 21/023 340/568.1 |

(Continued)

FOREIGN PATENT DOCUMENTS

| | | |
|---|---|---|
| CN | 203276293 U | 11/2013 |
| CN | 103584516 A | 2/2014 |

(Continued)

OTHER PUBLICATIONS

International Searching Authority, International Search Report, PCT/EP2020/087833, Dated May 31, 2021.

(Continued)

*Primary Examiner* — Kam Wan Ma
(74) *Attorney, Agent, or Firm* — Reichel Stohry Dean LLP; Mark C. Reichel; Natalie J. Dean

(57) ABSTRACT

A system for storing a plurality of tangible assets, the system having an RF component associable with a tangible asset, wherein the RF component has a unique identifier and is configured to receive a carrier signal and emit a modulated carrier signal, wherein modulation of the carrier signal is based on the unique identifier. The system also has an RF detection system having a plurality of RF coils, wherein each coil is arranged to emit a carrier signal and receive the modulated carrier signal emitted by the RF component, a processor in communication with each of the plurality of RF coils, wherein the processor is configured to poll the plurality of RF coils by selectively allowing current to flow through one or more of the plurality of RF coils at a time and identify the RF component based on modulation of the carrier signal.

19 Claims, 13 Drawing Sheets

(58) Field of Classification Search
USPC .................................................. 340/572.1
See application file for complete search history.

(56) References Cited

U.S. PATENT DOCUMENTS

| | | | |
|---|---|---|---|
| 2002/0067264 A1* | 6/2002 | Soehnlen | G06K 19/073 |
| | | | 340/568.1 |
| 2007/0090921 A1* | 4/2007 | Fisher | G07C 9/00896 |
| | | | 340/5.5 |
| 2007/0279229 A1 | 12/2007 | Shaffer et al. | |
| 2008/0143482 A1 | 6/2008 | Shoarinejad et al. | |
| 2012/0305655 A1 | 12/2012 | Eckerdt et al. | |
| 2014/0302788 A1 | 10/2014 | McKelvey | |
| 2015/0164259 A1 | 6/2015 | Eckerdt et al. | |
| 2016/0092708 A1* | 3/2016 | Burns | G01S 11/02 |
| | | | 340/10.1 |
| 2017/0243032 A1 | 8/2017 | Pesavento et al. | |
| 2019/0266457 A1 | 8/2019 | Salsberg | |

FOREIGN PATENT DOCUMENTS

| | | |
|---|---|---|
| CN | 203581765 U | 5/2014 |
| CN | 104444006 A | 3/2015 |
| CN | 107997414 A | 5/2018 |
| EP | 2234043 A1 | 9/2010 |
| WO | 97/09687 A1 | 3/1997 |
| WO | 00/16281 A1 | 3/2000 |

OTHER PUBLICATIONS

International Searching Authority, Written Opinion of the International Searching Authority, PCT/EP2020/087833.
UK Intellectual Property Office, Patents Act 1977: Search Report Under Section 17(5), GB1919132.9, Dated Jun. 23, 2020.
UK Intellectual Property Office, Patents Act 1977: Search Report Under Section 17(6), GB1919132.9, Dated Dec. 17, 2020.

* cited by examiner

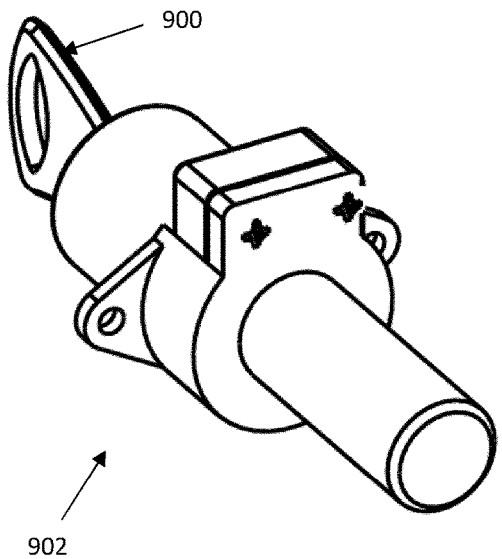
Figure 17
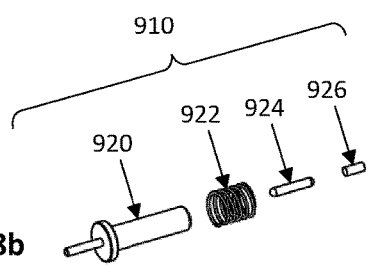
Figure 18b
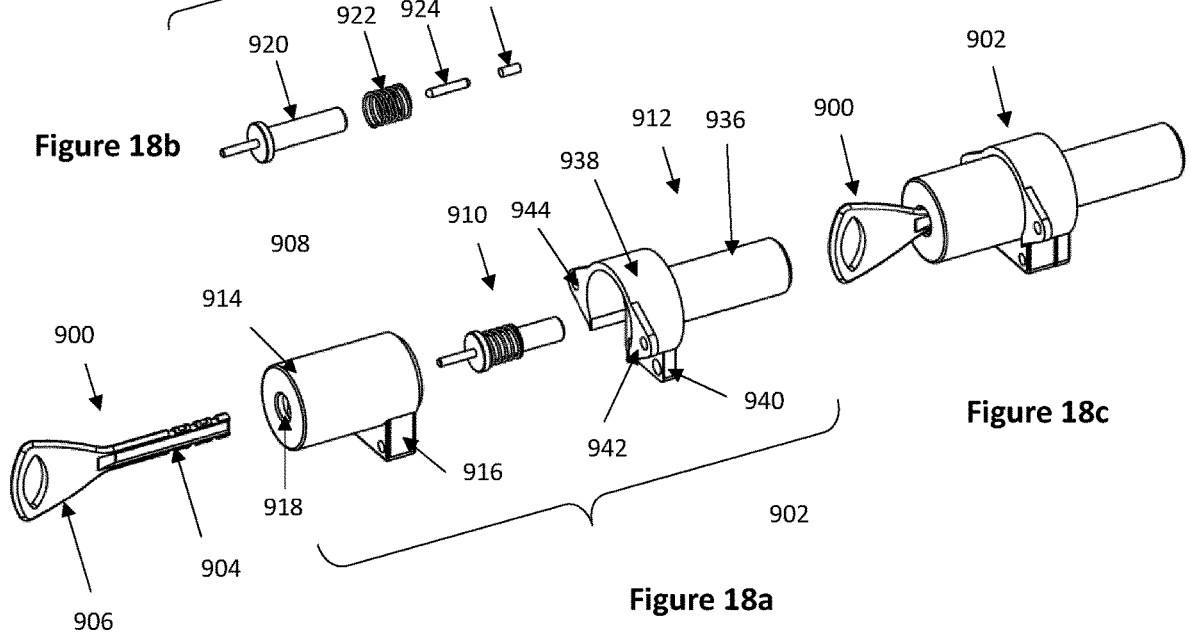
Figure 18c
Figure 18a

ASSET CONTROL SYSTEM

TECHNICAL FIELD OF THE INVENTION

The present invention relates to an asset control system. More specifically, the present invention relates to an electronic asset control system such as a locker for securing and tracking tangible assets such as keys.

BACKGROUND OF THE INVENTION

Asset control systems such as lockers for storing, securing and, in some cases, tracking keys and other assets are well known. However, managing access to individual keys in an environment where many keys are stored can present a number of challenges. As a particular example, a vehicle showroom will store at least one key for each vehicle in the showroom. Typically, the keys are stored in large key cabinets (or lockers), which can be capable of housing tens to hundreds of keys. In order to track the keys' whereabouts, each key is attached to a key fob which comprises a pin plug. When the key is to be returned after use, the pin plug is inserted into a corresponding receptacle, a locking system is engaged (or re-engaged) to secure the pin plug and a signal generated by a conductive contact between the pin plug and the receptacle is capable of identifying the key. When access is next authorised via the management software, the locking mechanism is released and the key can be removed. The break in the physical contact (or loss of any RFID signal in an RFID system) from withdrawal of the pin plug indicates that the key is no longer in the cabinet.

A problem that occurs with electromechanical identification, such as the plug and receptacle mentioned above, is that the mechanical force applied to a single key can make or break contact for other key pins in the cabinet. For example, if a user attempts to pull the incorrect key from the system, a large force is exerted which in turn can break the contact, as well as the contacts of the surrounding keys. This may result in incorrect key tracking data: a contact may be broken (indicating that the key has been removed from the cabinet) when in fact the key is still locked to the cabinet (and vice versa).

A possible circumvention of this problem is to avoid electromechanical identification and rely instead on wireless identification of the keys. However, most suitable wireless technologies are designed to transfer data over a relatively long distance range, which is unsuitable when identifying a key in order to determine that a locking mechanism can be operated in order to release the key. Depending on operational frequency, RFID systems typically operate over distances in the order of centimetres to the order of tens of metres. A fob or asset may be detected before it is physically locked into a desired position, which may result in an incorrect determination that the asset is secured. Additionally, the provision of components for reading RFID tags/fobs can be expensive for a system capable of reading multiple different tags.

It is object of the invention to avoid, or at least mitigate, the issues discussed above.

SUMMARY OF THE INVENTION

According to the present invention there is provided a system for storing a plurality of tangible assets, the system comprising:
an RF component, wherein the RF component is associable with a tangible asset, and wherein the RF component has a unique identifier and is configured to receive a carrier signal and emit a modulated carrier signal, wherein modulation of the carrier signal is based on the unique identifier;
an RF detection system, comprising:
a plurality of RF coils, wherein each coil is arranged to emit a carrier signal and receive the modulated carrier signal emitted by the RF component;
a processor in communication with each of the plurality of RF coils, wherein the processor is configured to:
poll the plurality of RF coils by selectively allowing current to flow through one or more of the plurality of RF coils at a time; and,
identify the RF component based on modulation of the carrier signal.

Preferably the processor is further configured to determine the distance between the RF component and the one of the RF coils based on the peak amplitude of the modulated carrier signal.

Preferably the plurality of RF coils are arranged on a single printed circuit board.

Preferably the processor is configured to poll the plurality of RF coils in a repeating sequence.

Preferably each of the plurality of RF coils comprises between 50 and 60 turns.

Preferably the plurality of RF coils are printed over 4 layers of a PCB.

The RF component may be a read/write RF component, and wherein the RF detection system is configured to write to each RF component via the plurality of RF coils.

Preferably the RF component stores unique identification data recognisable at a second RFID receiver, networked to the system, wherein the RF detection system is configured to update the unique identification data.

Preferably RF detection system is triggered to update the unique identification data upon identification.

Preferably the RF detection system is triggered to update the unique identification data at a specific time.

Preferably the updated unique identification data is communicated to the second RFID receiver networked to the system. For example an access control system.

According to a second aspect of the present invention there is provided a system for storing a tangible asset, comprising
a fob associable with a tangible asset;
an asset storage apparatus comprising:
a fob receptacle for receiving the fob,
a location mechanism configured to locate fob at a predetermined insertion depth within the fob receptacle by exerting an insertion force on the fob;
a sensor for determining the insertion depth of the fob within the receptacle; and
a controller comprising:
a processor for determining the insertion depth of the fob based on a signal from the sensor,
a memory having an asset register stored thereon,
wherein the controller configured to update the asset register to indicate that the fob is in the receptacle when the fob is at, or within a predetermined tolerance of, the predetermined insertion depth.

Preferably the location mechanism comprises at least one moveable component, wherein the at least one moveable component is resiliently biased towards a predetermined position, and wherein initial insertion of the fob into the fob receptacle causes movement of the at least one moveable component away from the predetermined position, and wherein full insertion of the fob into the receptable causes the at least one moveable component to return towards the predetermined position to locate the fob.

Preferably the at least one moveable component bears against a tapered surface of the fob to cause movement of the at least one moveable component away from the predetermined position.

Preferably the tapered surface of the fob terminates in a shoulder, such that upon location of the fob into the predetermined insertion depth, the at least one moveable component rides over the shoulder towards the predetermined position.

Preferably the system further comprises a solenoid lock, wherein the fob receptable is arranged to receive the pin of the solenoid lock, wherein the pin prevents the fob from being withdrawn from the fob receptacle.

According to a third aspect of the present invention there is provided a locking system, comprising:
a fob, wherein the fob is associable with a tangible asset;
an asset storage apparatus comprising:
a receptable for receiving the fob
a location mechanism configured to locate fob at a predetermined insertion depth within the fob receptacle by exerting an insertion force on the fob;
a lock for locking the fob in the receptacle;
wherein the lock is arranged to lock the fob in the receptacle when the fob is at, or within a predetermined tolerance of, the predetermined insertion depth in the receptacle.

Preferably the location mechanism comprises at least one moveable component, wherein the at least one moveable component is resiliently biased towards a predetermined position, and wherein initial insertion of the fob into the fob receptable causes movement of the at least one moveable component away from the predetermined position, and wherein full insertion of the fob into the receptable causes the at least one moveable component to return towards the predetermined position to locate the fob.

Preferably the at least one moveable component bears against a tapered surface of the fob to cause movement of the at least one moveable component away from the predetermined position.

Preferably the tapered surface of the fob terminates in a shoulder, such that upon location of the fob into the predetermined insertion depth, the at least one moveable component rides over the shoulder towards the predetermined position.

Preferably the system comprises an RF receiver, and wherein the fob comprises an RFID component, wherein the RFID component is configured to emit a signal identifying the fob and wherein the RF receiver is configured to receive the signal.

Preferably the system further comprises a controller in communication with the RF receiver, wherein the controller is configured to calculate the insertion distance of the RFID component based on the strength of the signal received by the RF receiver.

According to a fourth aspect of the present invention there is provided a locking system, comprising
a fob associable with a tangible asset, wherein the fob comprises a radio frequency (RF) transmitter; and,
an asset storage apparatus comprising;
an RF receiver, wherein the RF receiver is arranged to receive a signal from the RF transmitter, and
a processor, wherein the processor is configured to calculate the distance between the RF transmitter and the RF receiver based on a measured amplitude of a signal received by the RF receiver, and
a lock for securing a tangible asset associated with a fob,
wherein the lock is in communication with the processor and wherein, when the distance is determined to be within a predetermined range, the lock is arranged to secure a tangible asset.

Preferably the asset storage apparatus further comprises a receptacle for receiving the fob.

According to a fifth aspect of the present invention there is provided a system for storing a tangible asset, comprising
a RF component associable with a tangible asset, wherein the RF component comprises a radio frequency (RF) transmitter; and,
an asset storage apparatus comprising:
an RF receiver, wherein the RF receiver is arranged to receive a signal from the RF transmitter, and
a processor comprising a memory having an asset register stored thereon, wherein the processor is configured to calculate the distance between the RF transmitter and the RF receiver based on a measured amplitude of a signal received by the RF receiver, and wherein, when the distance is determined to be within a predetermined range, the processor is configured to update the asset register to indicate that the tangible asset is stored in the asset storage apparatus.

Preferably the RF component is comprised on a tag.

Preferably the RF component is comprised on a fob, and wherein the asset storage apparatus further comprises a receptacle for receiving the fob.

Preferably the asset storage apparatus comprises a locking device, wherein the locking device is arranged to lock the fob in the receptacle, and wherein the controller is configured to activate the locking device to lock the fob in the receptacle when the distance is determined to be within a predetermined range.

Preferably the processor is further configured to identify the RF component based on the signal received by the RF receiver.

According to a sixth aspect of the present invention there is provided an RF detection system, comprising
a plurality of RF coils, wherein each coil is arranged to emit a carrier signal and receive a modulated carrier signal;
an RF component, wherein the RF component has unique identifier and is configured to receive the carrier signal and emit a modulated carrier signal, wherein modulation of the carrier signal is based on the unique identifier;
a processor in communication with each of the plurality of RF coils, wherein the processor is configured to selectively allow current to flow through one or more RF coils at a time, and wherein the processor is further configured to identify the RF component based on modulation of the carrier signal, and
wherein the RF coils are arranged on a single printed circuit board.

Preferably the processor is further configured to determine the distance between the RF component and one of the one or more RF coils based on the peak amplitude of the modulated carrier signal.

Preferably the processor is configured to allow current to flow through the one or more RF coils in a sequence.

Preferably each of the plurality of RF coils comprises between 50 and 60 turns.

Preferably the plurality of RF coils are printed over 4 layers of the PCB.

According to a seventh aspect of the invention there is provided receptacle for storing a mechanical key, the receptacle comprising:
- a lock mechanism configured to permit insertion and rotation of a specific key, and to retain said specific key in an inserted position when said specific key is rotated;
- a plunger assembly comprising an RF component;
- wherein the plunger assembly is axially moveable and resiliently biased towards the lock cylinder such that insertion of the specific key into the lock mechanism moves the plunger and associated RF component from a first position to a second position against the resilient bias.

Preferably the plunger comprises a pin extending into a central bore of the lock mechanism, which pin is contacted by the specific key in use.

Preferably a receptacle body against which the plunger is biased with a compression spring is provided.

Preferably the lock mechanism is a tumbler lock mechanism. Preferably the lock mechanism is a disc tumbler lock mechanism.

According to the invention there is provided a system for storing a mechanical key, the system comprising
- a receptacle according to the seventh aspect, wherein RF component has a unique identifier and is configured to receive a carrier signal and emit a modulated carrier signal, wherein modulation of the carrier signal is based on the unique identifier;
- an RF detection system, comprising:
  - an RF coil arranged to emit a carrier signal and receive the modulated carrier signal emitted by the RF component;
  - a processor in communication with the RF coil, wherein the processor is configured to identify the RF component based on modulation of the carrier signal.

Preferably the processor is further configured to determine the distance between the RF component and the one of the RF coils based on the peak amplitude of the modulated carrier signal.

According to the invention there is provided a system for storing a plurality of mechanical keys, the system comprising:
- a plurality of receptacles according to the seventh aspect, wherein each RF component has a unique identifier and is configured to receive a carrier signal and emit a modulated carrier signal, wherein modulation of the carrier signal is based on the unique identifier;
- an RF detection system, comprising:
  - a plurality of RF coils, wherein each coil is arranged to emit a carrier signal and receive the modulated carrier signal emitted by the RF component;
  - a processor in communication with each of the plurality of RF coils, wherein the processor is configured to:
    - poll the plurality of RF coils by selectively allowing current to flow through one or more of the plurality of RF coils at a time; and,
    - identify the RF component based on modulation of the carrier signal.

BRIEF DESCRIPTION OF THE DRAWINGS

Embodiments of the invention will be described with reference to the figures in which:

FIG. 17 is a perspective view of a key and key receptacle according to an embodiment of the invention;

FIG. 18*a* is an exploded view of the key and key receptacle of FIG. 17;

FIG. 18*b* is an exploded view of a subassembly of the key receptacle of FIG. 17;

FIG. 18*c* is a perspective view of the key and key receptacle of FIG. 17;

DETAILED DESCRIPTION

Figure 1:
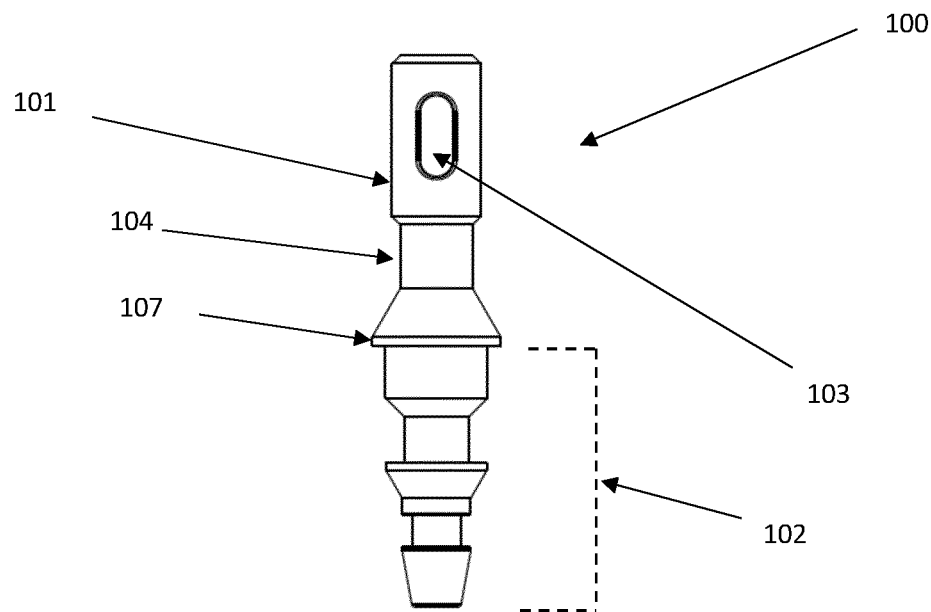
FIG. 1 is a side view of a fob according to an embodiment of the invention.

A fob is shown in FIG. 1. Fob 100 comprises main fob component 101 and fob tip component 102, both of which are made of a glass filled plastic, or a durable plastic, such as acetal copolymer. Fob tip component 102 is insertable into a fob receptacle, as will be described below. Main fob component 101 comprises aperture 103 to facilitate attachment to a key or other tangible asset, handle portion 104 and shoulder 107.

Figure 2A:
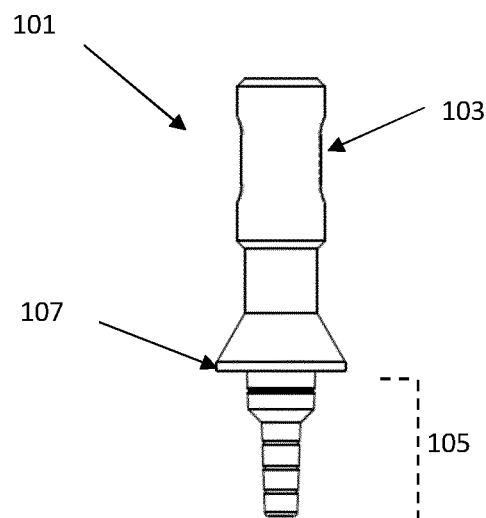
FIG. 2*a* is a side view of a main fob component according to an embodiment of the invention.
Figure 2B:
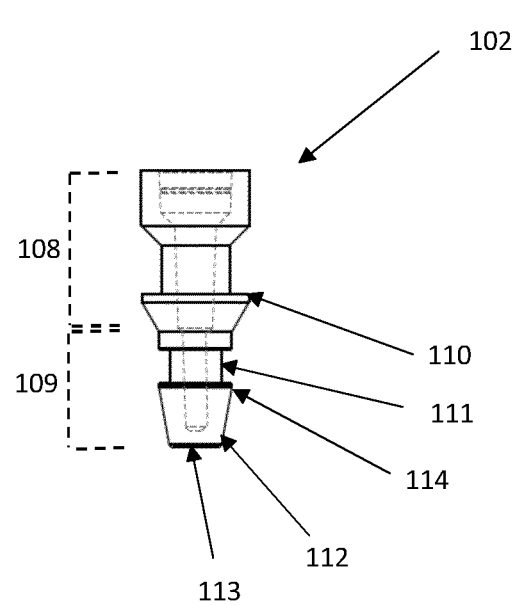
FIG. 2*b* is a side view of a fob tip component according to an embodiment of the invention.

Main fob component 101 is shown in FIG. 2*a* and fob tip component 102 is shown in FIG. 2*b*. Fob tip component 102 is generally hollow and is shaped internally to accommodate distal portion 105 of main fob component 101, such that distal portion 105 is covered by fob tip component 102 when fob tip component 102 and main fob component 101 are bonded together. Fob tip component 102 has a distal end 113, tapered end portion 112 and neck portion 111. Lip 114 and lip 110 are relevant for insertion and locking respectively, as will be described below.

Figure 3:
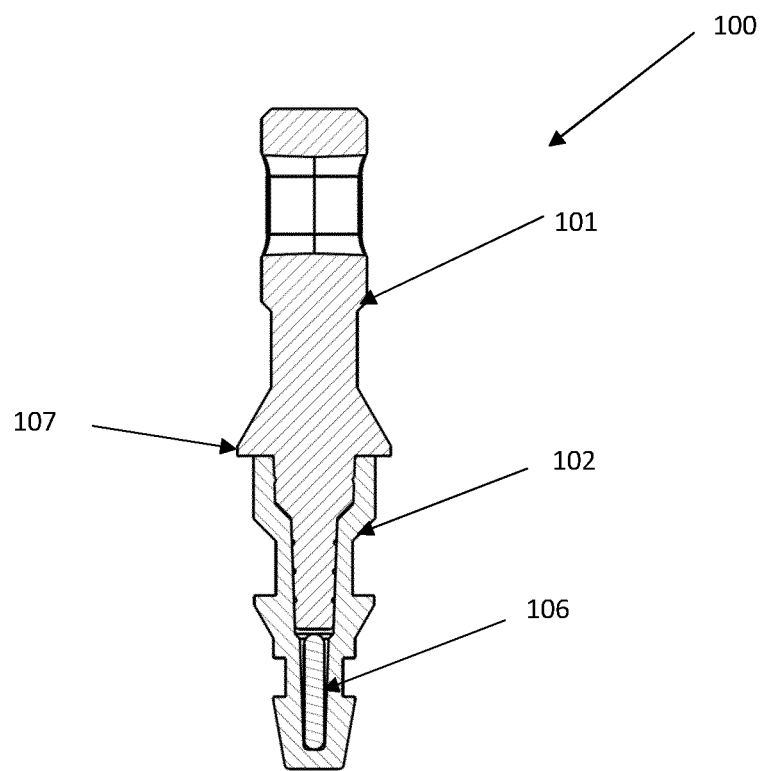
FIG. 3 is a cross section view of a fob according to an embodiment of the invention.

Prior to bonding, an RFID component is inserted into the end of fob tip component 102. This is shown in FIG. 3; RFID component 106 is secured within fob tip component 102 when fob tip component 102 is securely bonded with suitable adhesive (such as an epoxy adhesive) to main fob component 101. RFID component 106 comprises an antenna and an integrated circuit for uniquely identifying the particular component (and therefore fob 100), as is known in the art. In this embodiment, the RFID component 106 is passive.

Figure 4:
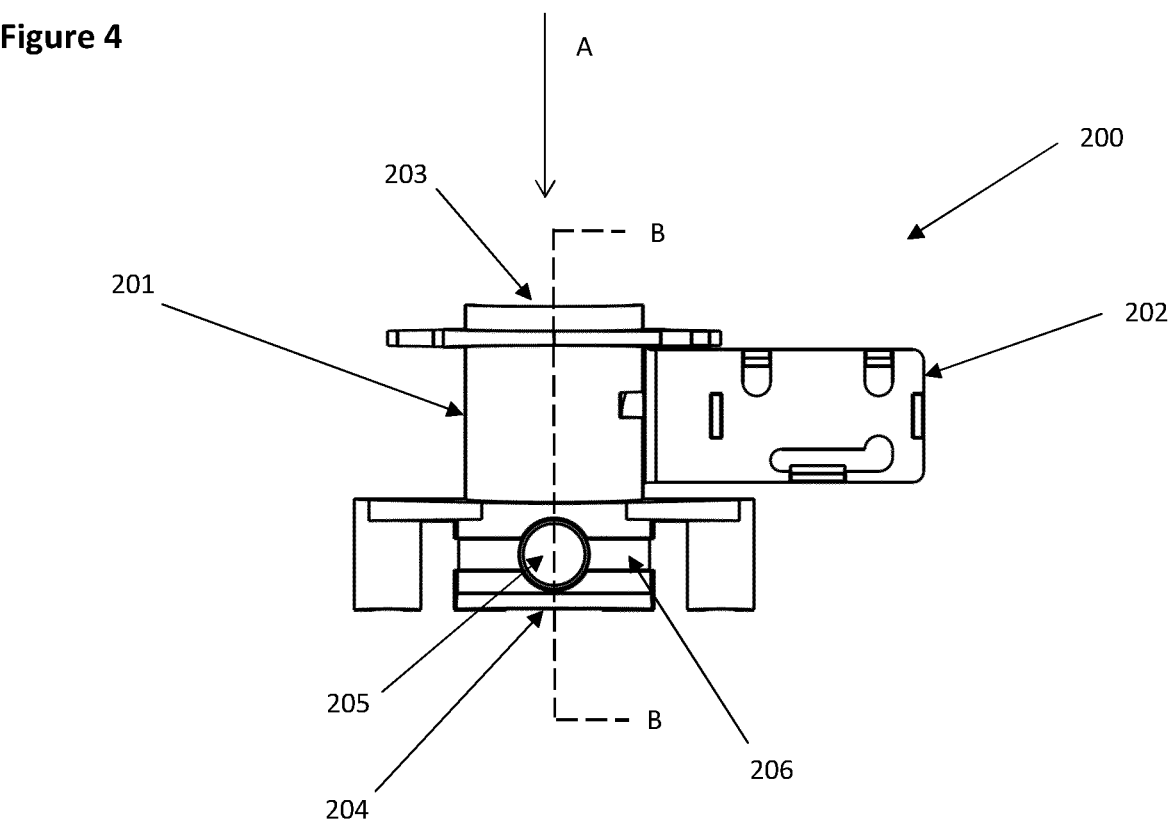
FIG. 4 is a side view of a fob receptacle according to an embodiment of the invention.

Fob receptable 200 is shown in FIG. 4. Receptacle 200 generally comprises receptable portion 201 and solenoid attachment portion 202 and is moulded from a durable material, such as a glass filled plastic or acetal copolymer. An elongate aperture extends vertically through receptacle portion 201 and is defined by upper opening 203 and lower opening 204. The elongate aperture is configured to receive fob tip component 102 of fob 100 at upper opening 203 in the direction of arrow A. When fob 100 is fully inserted into receptable portion 201, distal end 113 of second part 102 of key fob 100 extends beyond lower opening 204. Since shoulder 107 of main fob component 101 is wider than opening 203, fob 100, when fully inserted into receptacle portion 102, is prevented from being inserted further into receptacle 102 than shoulder 107 allows.

Receptacle portion 201 comprises two diametrically-opposed concave apertures, each of which extends laterally through receptacle portion 201. One concave aperture 205 is shown in FIG. 4. Each concave aperture 205 is configured to receive a ball bearing (not shown) and is shaped such that the ball bearing can rotate and move laterally within concave aperture 205. At least part of the ball bearing protrudes beyond an internal wall of the elongate aperture of receptacle portion 201. In an embodiment, the ball bearings are optimally 6 mm in diameter and made of steel.

Figure 7:
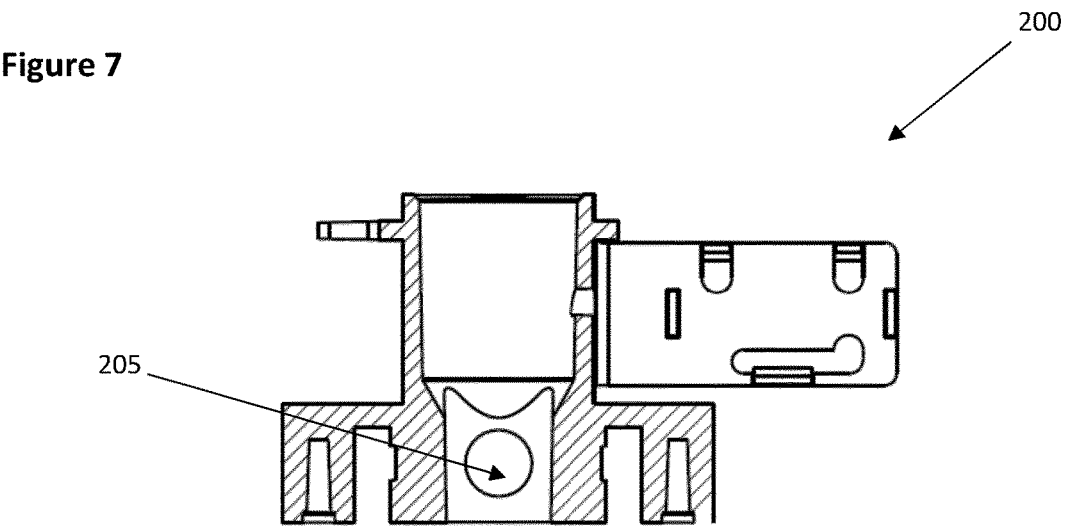
FIG. 7 is a cross sectional view of a fob receptacle according to an embodiment of the invention.

Annular recess 206 extends circumferentially around receptacle portion 201 and is arranged to receive an o-ring (not shown), which is preferably made of fluorocarbon elastomer. The o-ring holds each ball bearing within aperture 205 and, due to the elasticity of the o-ring, allows lateral movement of the ball bearings. The tendency of the rubber band to return to a predefined tension means, however, that the ball bearings are biased towards a resting position which is as close to the centre of the elongate aperture as the shape of concave aperture 205 allows. In other words, the o-ring biases the ball bearings as far into the aperture 205 such that they protrude beyond the internal wall of the elongate aperture of receptacle portion 201. This force applied by the ball bearings on the fob secures the fob in a predetermined position to locate the fob within the receptacle. FIG. 7 is a cross sectional view of fob receptacle along line C-C, which shows concave aperture 205.

Figure 5:
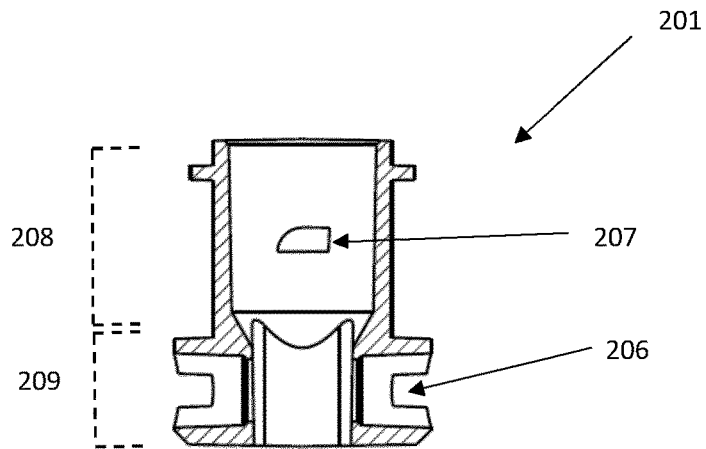
FIG. 5 is a cross sectional view of a fob receptacle according to an embodiment of the invention.
Figure 6:
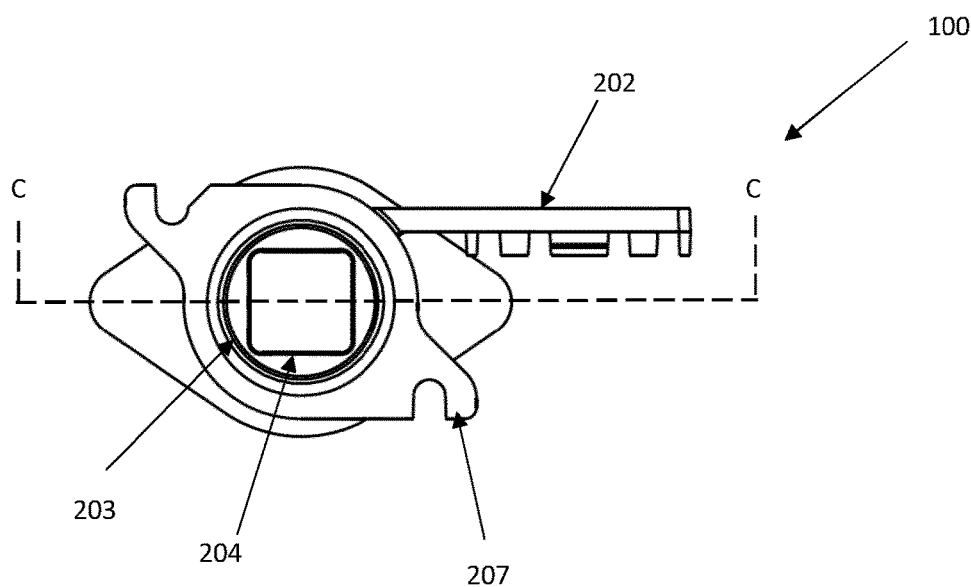
FIG. 6 is a plan view of a fob receptacle according to an embodiment of the invention.

A cross sectional view of receptacle portion 201, along line B-B, is shown in FIG. 5. Opening 207 extends through the wall of receptacle portion 201 and is shaped to receive the locking bolt of an open frame solenoid (not shown). As can be seen, the cross-sectional diameter of elongate aperture of receptacle portion 201 changes along its length. Upper section 208 has a circular cross section whose diameter is wider that the width of lower section 209, which has a square cross section. FIG. 6 illustrates the cross-sectional shape of elongate aperture. Lower opening 204 is square and upper opening is circular.

Referring to FIG. 2*b*, it can be seen that the upper section 108 of fob tip component 102 is, at its widest parts, wider than the widest part of lower section 109. When fob tip component 102 is fully inserted into fob receptacle 200, lower section 109 lies within lower section 209 and upper section 108 lies within upper section 108.

Figure 8:
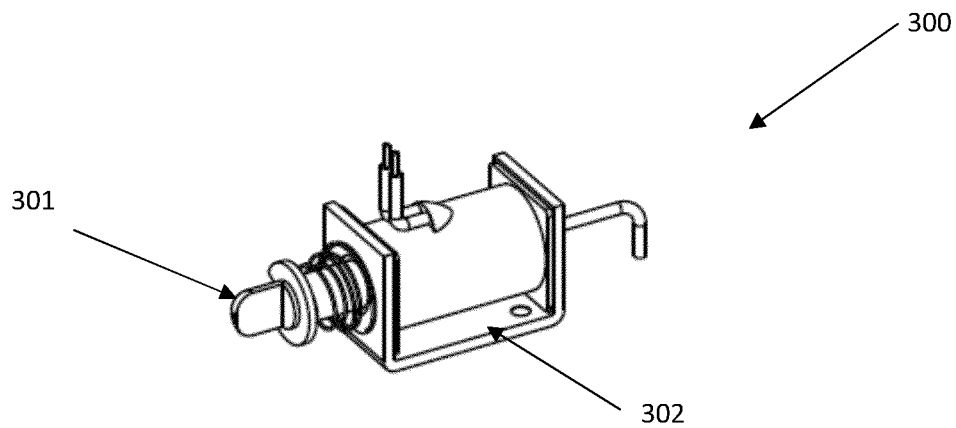
FIG. 8 is a perspective view of a solenoid lock.
Figure 9:
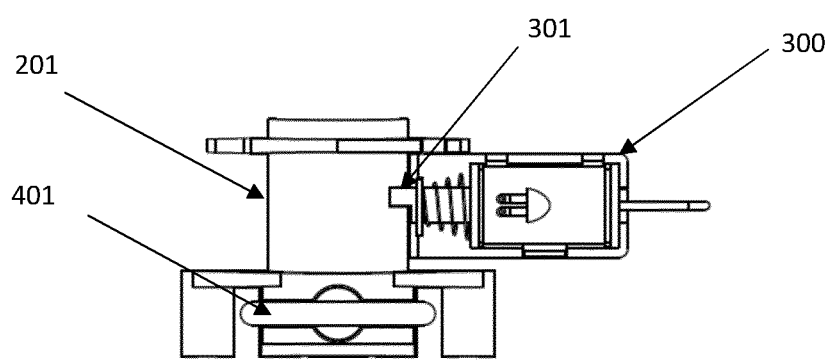
FIG. 9 is a side view of a fob receptacle and solenoid lock according to an embodiment of the invention.

Sliding pin solenoid lock 300 is shown in FIG. 8 and generally operates according to principles known in the art. Lock 300 includes pin 301, the tip of which is generally semi-circular in cross section, but may alternatively be squared-off. Plate 302 comprises screw holes to facilitate attachment to solenoid lock portion 202 of fob receptable 200. When lock 300 is secured to solenoid lock portion 202 and pin 301 is extended in a lock position, pin 301 extends through opening 207 of receptacle portion 201 and into the elongate aperture of receptacle portion 201. When fob 100 is fully inserted into fob receptacle 200, pin 301 extends into elongate aperture above lip 110 of fob tip component 102 (see FIG. 2*b*). As such, fob 100 cannot be removed from fob receptacle 200 when the solenoid is deenergised. FIG. 9 is a side view of fob receptacle 200 and solenoid lock 300, where pin 301 extends through opening 207.

Figure 10:
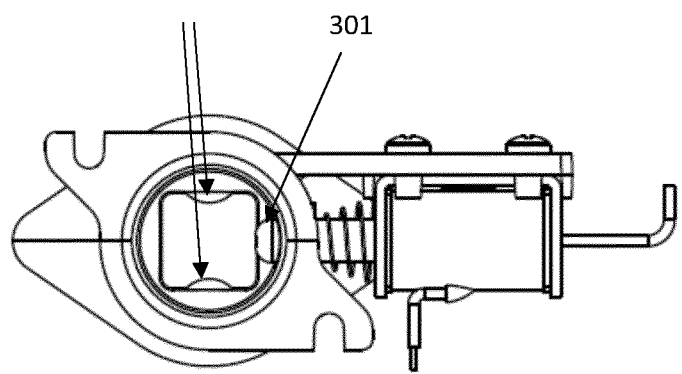
FIG. 10 is a top plan view of a fob receptacle and solenoid lock according to an embodiment of the invention.
Figure 11:
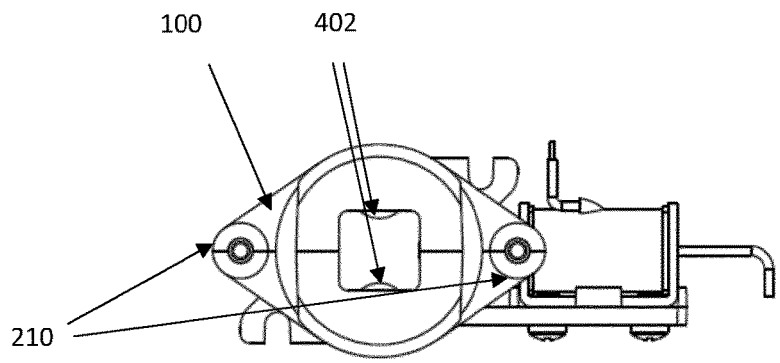
FIG. 11 is a bottom plan view of a fob receptacle and solenoid lock according to an embodiment of the invention.

FIGS. 10 and 11 are a top plan view and bottom plan view respectively of fob receptacle 200 and solenoid lock 300. Pin 301 extends through opening 207 to protrude into the elongate aperture of receptacle portion 201. Ball bearings 402 also partially protrude into elongate aperture.

O-ring 401 and ball bearings 402 ensure the fob is correctly positioned in fob receptacle 200. When correctly positioned, lip 110 of fob tip component 102 sits between opening 207 and lower opening 204 of receptable portion 201, such that, when pin 301 is engaged, it protrudes into the elongate aperture above lip 110, thereby preventing withdrawal of fob 100 from receptacle 200. When fob 100 is inserted, lip 110 pushes pin 301 back towards opening 207. Pin 301 is arranged to revert back to its default, fully extended position (as is known in the art) such that the tip of pin 301 lies adjacent to portion 115 of fob tip component, such that fob 100 cannot be removed from receptacle 200, as discussed above.

Referring again to FIG. 2*b*, it can be seen that lower section 109 of fob tip component 102 comprises a tapered end portion 112 and an adjacent narrow neck portion 111. The width of the distal end 113 of lower section 109 is wider than the distance between the two ball bearings when biased towards the central axis of elongate aperture. Accordingly, when fob 100 is inserted into receptacle portion 201, tapered end portion 112 pushes each ball bearing against the biasing of the o-ring. As the fob 100 is inserted further into receptacle 200, the circumference of the ball bearings becomes level with lip 114. As the circumference of the ball bearings become level with, and just passes, lip 114, the inward force on the ball bearings from the o-ring urges lip 114 to move beyond the diameter of the ball bearings (and so forces the fob into a defined location within the receptacle, where the ball bearings lie adjacent to neck portion 111). When the ball bearings rest adjacent to narrow portion 111, the fob is fully inserted in the receptacle. When bolt 301 is released and fob 100 is withdrawn from receptacle portion 201, the ball bearings are pushed part by lip 114.

When fob is fully inserted into receptacle 200, edge of opening 207 (closest to lower opening 204) and lip 110 are separated by approximately 2 mm. Accordingly, when fob 100 is locked in receptacle 200, it can be moved (in a direction opposite to arrow A) by approximately 2 mm before being prevented from being withdrawn further due to pin 301.

Figure 12:
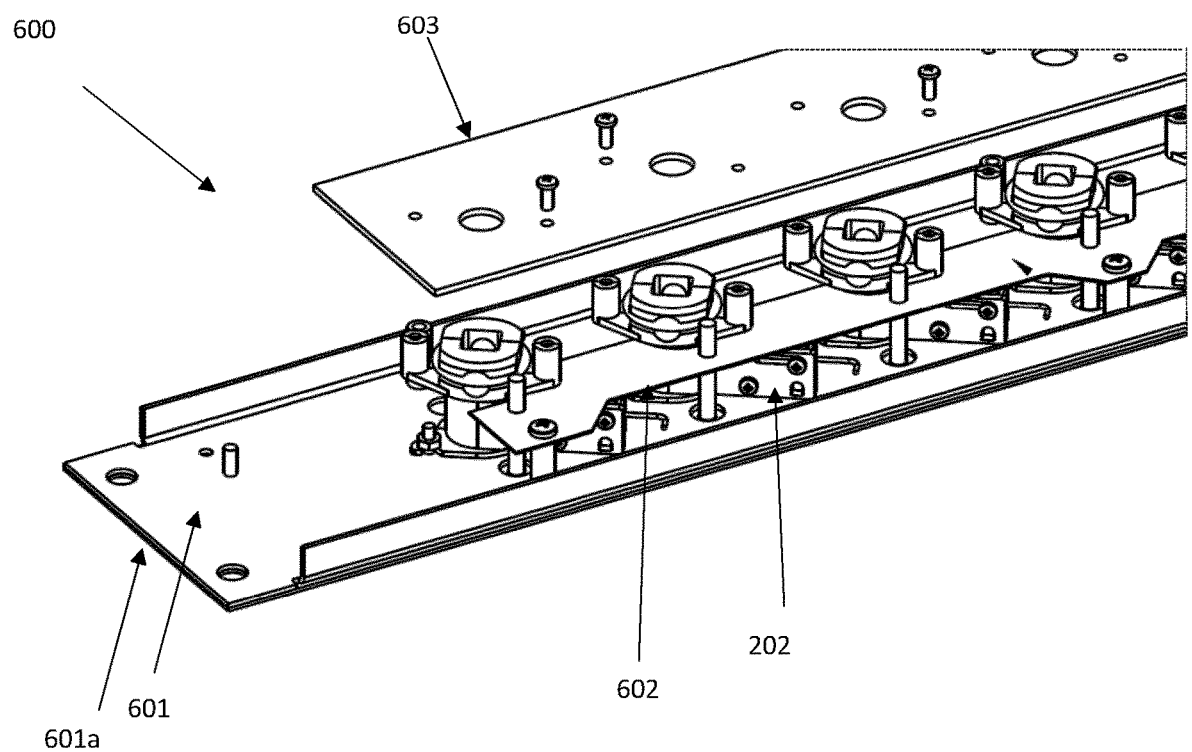
FIG. 12 is a perspective view of a fob cabinet assembly according to an embodiment of the invention.

FIG. 12 is an expanded perspective view of the main components of a cabinet assembly 600. Multiple receptacles are arranged on and secured to an outer panel of a key cabinet so as to secure multiple fobs. Panel assembly 600 comprises external panel 601, intermediate panel 602 and internal panel 603. Side 601a of external panel is visible to a user. Lugs 210 of receptacle 200 are secured to internal panel 603 by screws. Lugs 207 are secured to external panel 601.

Figure 13:
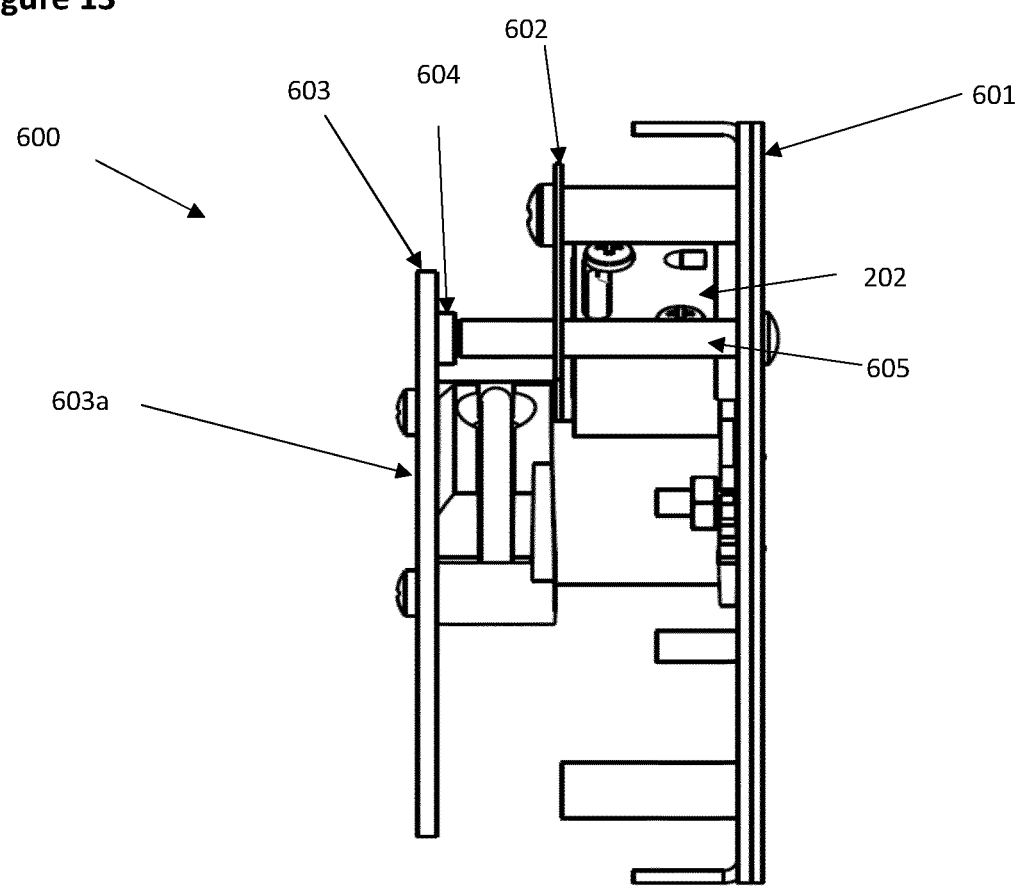
FIG. 13 is a side view of a fob cabinet assembly according to an embodiment of the invention.

FIG. 13 is a side view of panel assembly 600. A printed circuit board (PCB) (not shown) is located on the rear side 602a of internal panel 602 The PCB, and therefore the RF transceiver coil arrangement, is separated (and shielded) from solenoid lock 300 by internal panel 603 and intermediate panel 602, which helps avoid interference of the RF signals from the solenoid field.

LED 604 is secured to internal panel 602. Light pipe 605 facilitates visibility of LED from external panel 601. LED 604 is positioned adjacent to each external fob receptacle opening 203. The LEDs can be programmed such that the LED for a particular fob receptacle is active when the fob in the receptacle has been authorised for removal. External panel 601 is separated from intermediate panel 602 by a solenoid lock portion 202 of fob receptacle 200.

Figure 14:
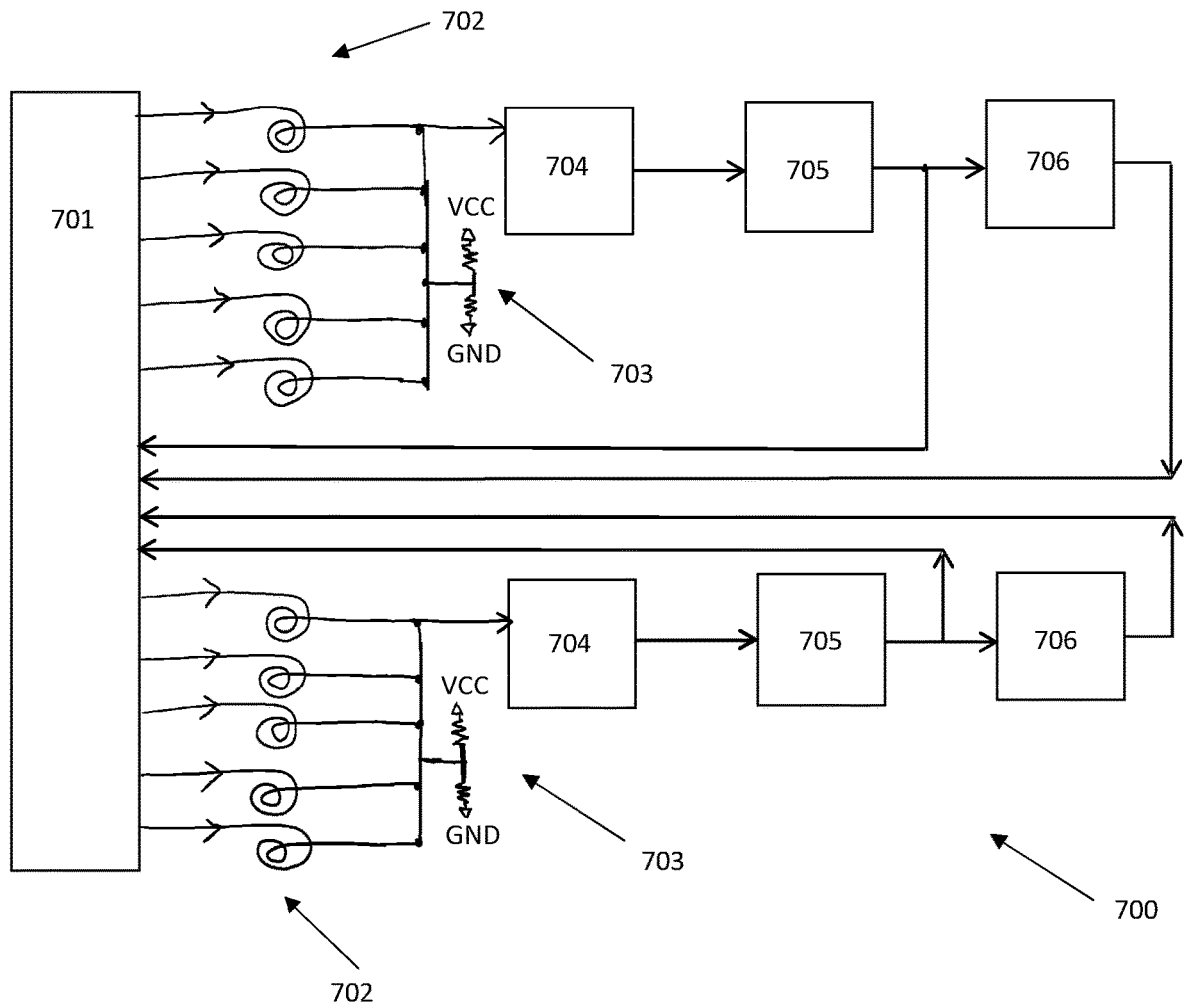
FIG. 14 is a diagram of the main components of an RFID detection system according to an embodiment of the invention.

FIG. 14 is a diagram of the main components in an RFID detection system 700 comprising 10 receptacles (or pegs). Each receptable/peg has a corresponding pin port which in turn has a corresponding RF receiver coil (which together are denoted by coils 702). Microcontroller 701 has a Peripheral Pin Select (PPS) function which allows each pin port to be configured as an input or output. A 125 KHz signal from an internal timer in microcontroller 701 is configured to input to the pin ports in parallel. The pin ports are configured as analogue inputs so that inputs to microcontroller 701 do not draw excessive current when the pin ports are biased to half VCC by load resistors 703. The pin ports are switched to be outputs, one at a time in sequence, and the pin port that is an output forces a 125 KHz current through its corresponding coil and into the load resistors 703. No current flows through the other coils at this time because the other pin ports are inputs. As a fob approaches a receptacle (when, for example, a user is returning a key to the cabinet) and comes into the range of a signal transmitted by the RF transceiver coils, a microchip in the fob is able to transmit a signal back to the RF transceiver coils, as is known in the art of passive RF systems. The microchip in the fob will modulate the signal to incorporate the fob's unique identifier, such that modulation of the coil carrier signal by the RFID component uniquely identifies fob 100, and therefore the key or other asset that fob 100 is attached to. Due to the relatively close proximity of the fob with the coil, the current required to elicit a signal from the fob can be achieved by the pin ports, without requiring extra driver circuits. Ferrite present in the RFID component of the fob bends the flux lines emanating from the coils when the tag is aligned with and in close proximity to the centre of the coils (i.e. when it is within the receptacle).

The modulated current in the coils (due to the fob's modulated signal) results in a modulated voltage on the junction of load resistors 703. The voltage signal amplitude will be dependent upon the proximity of the fob to the coils; the closer the fob is to the coils, the greater the amplitude. The modulated voltage is passed through a peak detector 704 and filter 705 to remove the 125 KHz carrier as well as low frequency interference. The filtered signal is then fed back to microcontroller 701 which measures the peak-to-peak level of the signal to determine the amplitude. The signal strength/amplitude is used to determine the distance of the fob relative to the coil. The filtered signal is also passed through a zero-crossing detector 706 which converts the signal to logic levels before sending the signal back to microcontroller 701 for decoding. In an alternative embodiment, microcontroller 701 is able to extract the required data without the need for a zero-crossing detector 7.

Accordingly, it will be appreciated that it is not the RF field strength that is being measured by the processor, but the amplitude of the modulated voltage signal in the coils. The extent of the modulation which will vary according to the extent of 'absorption' of the emitted RF signal from the coils by the fob; the signal emitted by from the fob will have a different clock cycle to the signal received by the fob. This data allows the processor to identify the fob.

As per the embodiment shown in FIG. 14, twin detection circuits are used. This provides a faster response, and beneficially the cost of dual op-amps and comparators is approximately the same (or cheaper) than single devices. The additional cost for twin detection circuits is therefore a few passive components. For a ten pin port twin detection arrangement, the current circuit uses coils scanned two at a time in banks of five. A pair of coils can be polled simultaneously in 36 ms, and therefore all ten pin ports can be read at a rate of more than 5 times per second which gives an almost imperceptible time delay from someone pulling an unauthorised fob to the alarm being sounded.

The number of coils (which is the same for each layer) chosen is based on a compromise between increasing field strength and printing the coils so that there are no, or limited reception issues. It has been found that around 50 to 60 turns on each RF receiver coil allows each pin port to output a signal strong enough to activate an RFID chip in a fob. The coil turns are printed on both sides of a PCB. However, since the cost of a PCB is dependent on the track width and spacing, 4-layer PCB technology is utilised, such that the turns are spread over 4 layers.

The smaller the outside diameter of the coil, the faster the received signal drops with fob distance from the coil. The inner coil diameter is therefore as small as possible and is limited by (and is ideally equal to) the width of opening 204 of receptacle 200. The outer coil diameter is also preferably as small as possible so as to limit curvature of the field emanating from the coils. In a preferred embodiment, the diameter of the outer coil is between 1.2 cm and 3 cm. When the diameters of the inner and outer coils are as small as possible, the emitting field shape is optimised for accurate distance determination, such that the amplitude of the current in the coils from RFID component 106 varies significantly over a small distance range. This enables an accurate absolute or relative distance determination.

Accordingly, the present invention utilises a single processor for the sequential operation of multiple RF coils, which are all printed onto a single PCB. This provides significant cost savings—using separate circuitry and processor for each coil (for each receptacle) would be prohibitively expensive for a cabinet housing multiple fobs.

The particular arrangement of the coils (i.e. their diameter and number), in conjunction with the ferrite in the fob, and the design of the circuitry, means that the extent to which the fob is inserted into the receptacle can be measured, accurate to around 1 mm, rather than a binary determination of whether or not the fob is in the receptacle. The ability to determine the extent to which the fob is inserted in the receptacle allow for tamper detection (with or without locking), as will be discussed below.

The PCB arrangement described for accurately measuring distance between an RF component and an RF coil could also be utilised in a system in which the RF component is comprised in a fob having any shape or form. For example, the fob could be a card. Furthermore, distance measurement as herein described could also be used in a system in which an RF component, such as a tag, is directly fixed to an asset. As an example, an RF tag may be secured directly to a tool. A tool box, cabinet or other storage means comprises one or more RF coils, and may be configured to allow storage of the tool in a specific position and/or orientation. The distance between the tag and the RF coil is measured and a determination is made, based on the measured distance, as to whether the tool has been returned.

This distance accuracy is a departure from existing passive RFID systems and results from the arrangement of the RF transceiver coils, as discussed above. Accordingly, the processor, in conjunction with a fob management software application, is able to determine the distance of fob 100 from fob receptacle 200 (again, based on calibration data) and, more specifically, determine how far fob 100 is inserted into receptacle portion 201. Optimally, the highest voltage signal amplitude in the relevant coil is measured when fob 100 is fully inserted into receptacle 200. Based on the determination of peak amplitude, the fob management application can determine that a fob is fully inserted and therefore if it is mechanically locked in position. The distance accuracy avoids a false determination of the presence of the fob in the receptacle, which can occur in systems whose distance accuracy is less accurate. For example, in such a system, a fob could be bought close to the RF transceiver (but not be inserted into a receptacle) such that the fob management application makes an incorrect determination that the key has been returned and records that the key has been returned fully or into a locked position, when in fact it has not. In the present invention, determination that the fob is fully inserted in the receptacle is also determination that the fob is locked in the receptacle.

In this way, the fob management application is also able to determine the extent to which fob resides in receptacle 200 and control solenoid lock 300 accordingly. In particular, this allows the fob management application to determine whether slight movement of fob 100 within receptacle 200, even when authorisation to remove a key has not been granted and the solenoid pin 301 has not been released/energised.

The system can be programmed to allow for an 'override' facility, which allows for the release of pin 301 for a specific fob receptacle (to allow for removal of the corresponding fob) without gaining authorisation for the removal. In an override scenario, authorisation for all fobs is provided (by, for example, the entering of a singular override code into the key management application, or other specific operation). When fob 100 is pulled from receptacle 200, the processor is able to detect a drop in the coil current as a result on the increasing distance between the fob and the coil and determine that the fob is being withdrawn. Determination of this movement triggers release of pin 301 so that fob 100 can be removed. This avoids the need to release the pins for all fobs, which would require a significant amount of power. Only one fob at a time can be removed in this manner. If the user has not been pre-authorised, detected movement of the fob may trigger a tamper alarm, or the information is recorded by the fob management software application.

In another scenario, only specific fobs are authorised for released. In this scenario, a user may not need to request specific fobs on a controller or device. If an authorised fob is pulled from its receptacle (such that a change in its position is detected), the solenoid pin for that fob is released so that the fob can be removed. The bolt is not released for fobs that are not authorised. In a further scenario, fob position/movement change detection is disabled. Authorisation for the removal of a particular key is granted, and the bolt for the corresponding receptacle is released to allow for removal of the fob.

Figure 15:
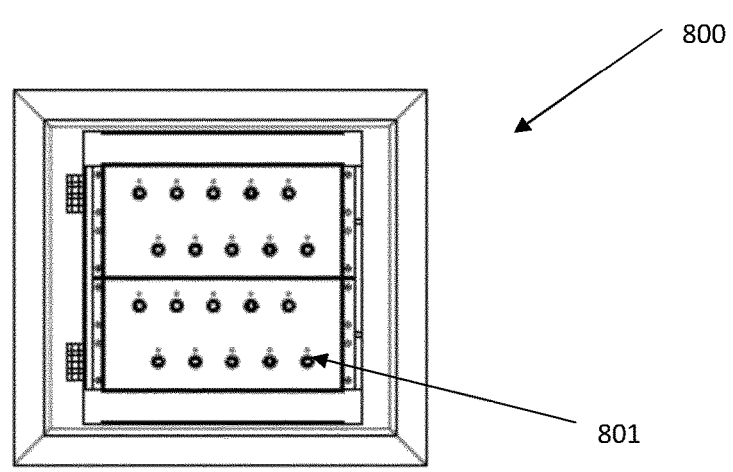
FIG. 15 is a front view of a small fob cabinet according to an embodiment of the invention.
Figure 16:
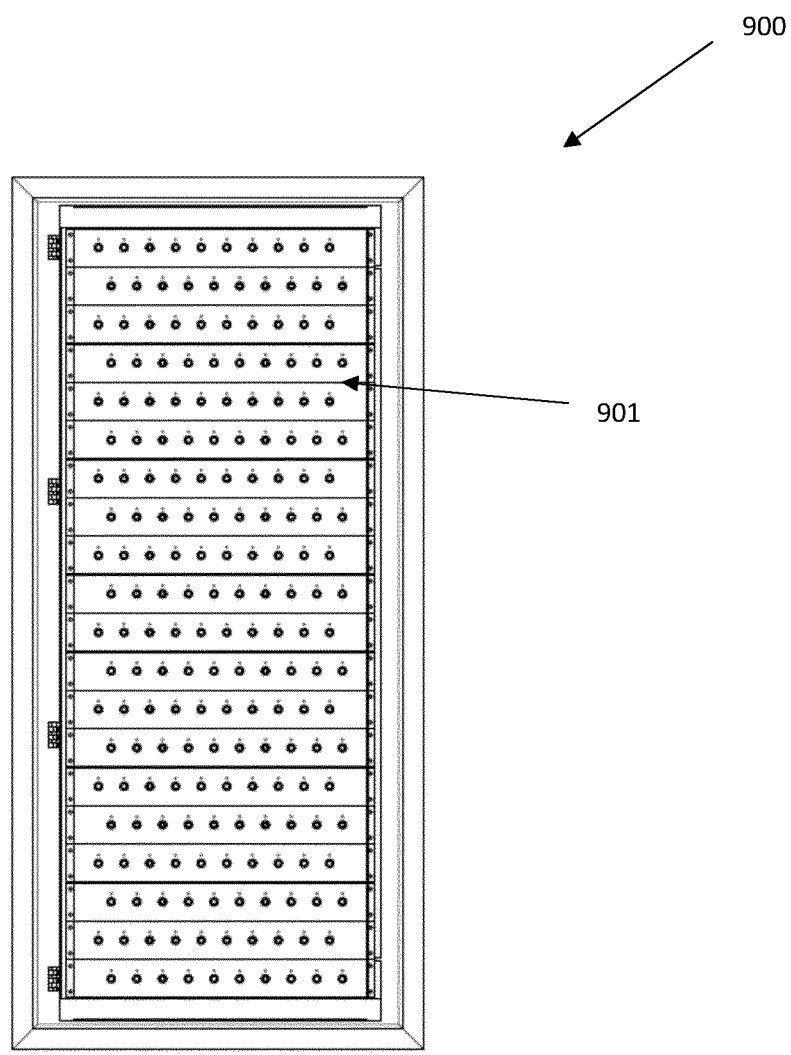
FIG. 16 is a front view of a large fob cabinet according to an embodiment of the invention.

A small cabinet 800 capable of securing 20 keys 801 is shown in FIG. 15. A large cabinet 900 capable of securing 200 keys 901 is shown in FIG. 16. It will be appreciated that the cabinet (or other repository) can be made according to specific requirements.

A fob removal operation will now be described. Fob 100 is fully inserted into fob receptacle 200. Lock 300 is deenergised such that bolt 301 prevents removal of fob 100 from receptacle 200. A user wishing to remove the key requests authorisation to do so via a fob management application. Request of such authorisation may involve the user entering a passcode, providing biometric data (or otherwise identifying themselves) on or to a fob management application (possibly via a mobile device), requesting a specific key and providing a reason if required. If authorisation is not granted, the lock is not released and the user cannot remove the fob 100 from receptacle 200. If authorisation is granted, the fob management application records that the user has been granted access to a specific key or asset, and the LED adjacent to the receptacle which houses the authorised fob is activated, so that the user is able to identify the fob associated with the desired asset. Lock 300 is released and pin 301 is withdrawn from opening 207 such that the user is able to remove key fob 100 from fob receptacle 200. The fob management application determines, based on analysis of voltage signal amplitude as described above, that the fob has been removed and records that the fob is no longer secured.

In a fob return operation, a fob 100 is inserted into any receptacle. The fob pushes the pin of the solenoid lock and the pin returns to its original position when the fob in inserted in the receptacle to lock the fob in the receptacle. The RFID component 106 receives an interrogation signal from the RF transceiver coils and sends a signal back to the RF transceiver coils which is analysed by a processor. The fob management application identifies the key attached to the particular fob based on the information from the processor. Depending on desired complexity and specific requirements, the fob management application may determine, based on stored data, whether the key is expected to be returned, whether it is being returned at the expected date and time, whether it has been returned to the correct receptacle, etc. and the determinations will be logged as appropriate. The sensor determines, based on the detected peak amplitude of the RFID signal, that the fob is in the correct position within the receptacle (as discussed above). Based on this determination, the fob management application records that the fob is secure, and the fob management application records that the key has been returned for secure storage. In an alternative embodiment, the system instructs release of the pin of the solenoid bolt (i.e. the lock is energised. In this case, the pin is shaped such that it can only be inserted in a particular position and or depth within the receptacle until the lock is energised. The RF system identifies the fob and subsequently instructs release of the solenoid pin so that the fob can be fully inserted. The lock would then be deenergised to lock the fob in the receptacle.

Referring to FIGS. 17 to 20b there is shown a further embodiment of the present invention comprising a key 900 and a receptacle 902.

The key 900 is a unitary component, comprising a blade 904 and a bow 906. They key 900 shown is a key for a disc tumbler lock.

The receptacle 902 comprises a cylinder 908, a plunger sub-assembly 910, a receptacle body 912.

The cylinder 908 comprises a cylindrical body portion 914 and a boss 916. The body portion 914 defines a central through-bore 918. The cylinder 908 comprises an internal disc tumbler mechanism The cylinder 908 comprises an internal disc tumbler mechanism 909 (shown schematically) that corresponds to the key 900. The mechanism 909 is configured such that only the key 900 (and no other keys) can be rotated. The mechanism, like all disc tumbler lock mechanisms, is configured to inhibit removal (i.e. axial motion out of the cylinder) when the key is in a rotated/locked condition. The mechanism is also configured to prevent full insertion of any key that does not have the specific blade configuration of the key 900.

The plunger sub-assembly 910 is shown in more detail in FIG. 18b and comprises a plunger 920, a compression spring 922, an RFID tag 924 comprising a microchip and a plug 926. The plunger 920 comprises a cylindrical body part 928, a flange 930 at one end thereof and a blind bore 932 at the opposite end thereof. A pin 934 extends from the flange end.

The receptacle body 912 comprises a generally hollow cylindrical body portion 936, a collar 938, a lug 940 and two diametrically opposed attachment flanges 942, 944 extending from the collar 938. The body portion 936 defines an internal shoulder 946.

Figure 20A:
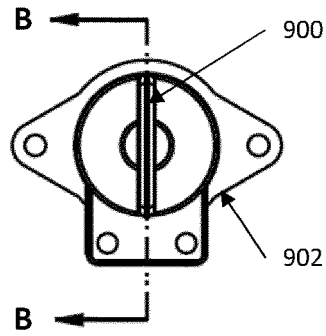
FIG. 20*a* is an end view of the key and key receptacle of FIG. 17, from the key end in a second condition.
Figure 20B:
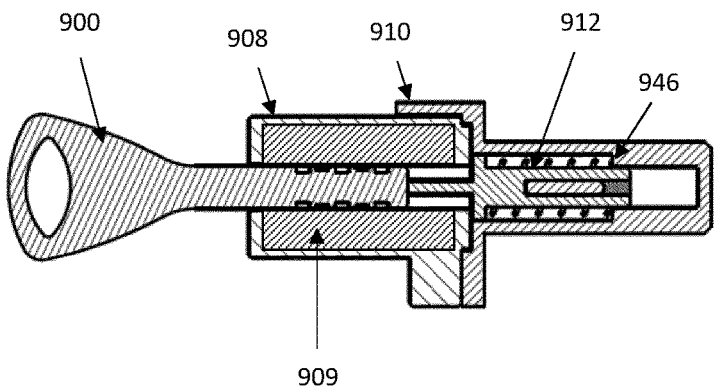
FIG. 20*b* is a section view of BB in FIG. 20*a*.

The RFID tag 924 is placed within the bore 932 in the plunger 920, and retained therein with the plug 926. The assembled plunger 920 is then resiliently mounted within the receptacle body by positioning the spring 922 between the shoulder 946 and flange 930 to urge the plunger 920 towards the collar 910. The cylinder is assembled to the receptacle body by attaching the boss 916 and lug 940 with suitable mechanical fasteners. The cylinder 908 thereby traps the plunger 920 to limit its movement under the force of the spring to a first, non-sense, position as shown in FIG. 20b. In this position, the pin 934 extends into the bore 918 of the cylinder 908.

Figure 19A:
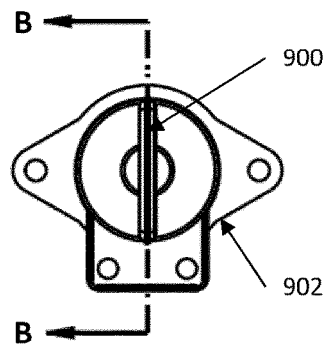
FIG. 19*a* is an end view of the key and key receptacle of FIG. 17, from the key end in a first condition.
Figure 19B:
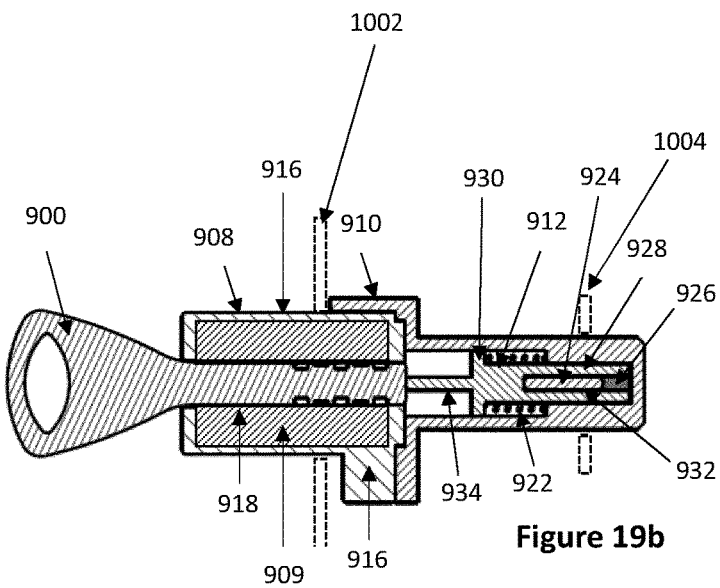
FIG. 19*b* is a section view of BB in FIG. 19*a*.

When the correct key 900 is inserted into the cylinder 908 as shown in FIG. 19b, the end of the blade 904 pushes the pin 934 and therefore the plunger 920 into the receptacle body 902 against the bias of the spring 922. This moves the plunger to the second, sense, position as shown in FIG. 19b. In the inserted position, the key 900 is rotated which engages the mechanism 909 and retains the key in situ.

If an incorrect key is inserted, it cannot be inserted the entire distance to the pin 834 and as such the pin cannot be depressed. Even if the user manages to insert the key as far as the plunger, the mechanism 909 ensures that it cannot be rotated, and therefore will simply be pushed out by the force of the spring 912.

Figure 21A:
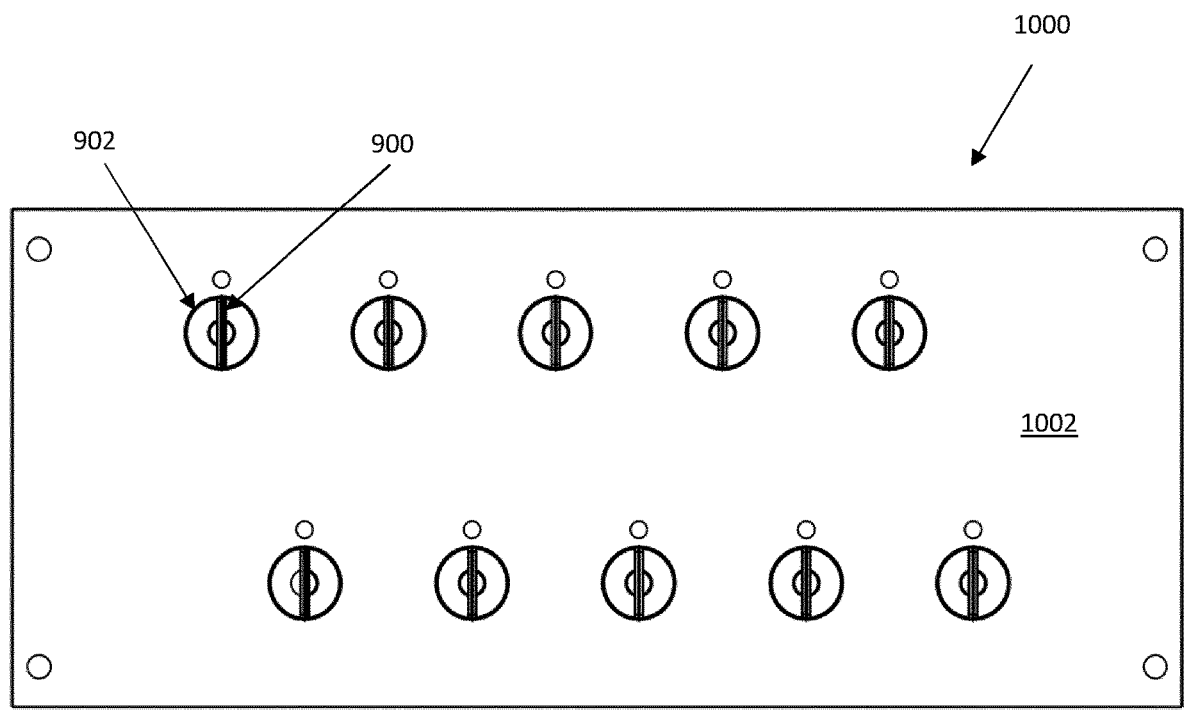
FIG. 21*a* is a front view of a cabinet assembly comprising multiple receptacles.
Figure 21B:
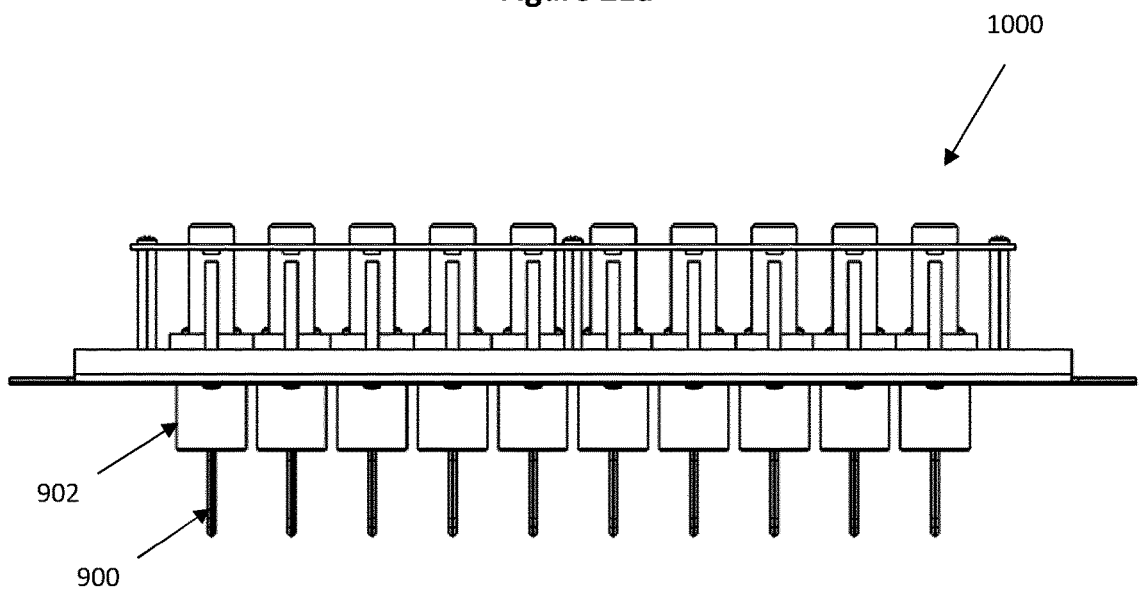
FIG. 21*b* is a top view of the assembly of FIG. 21*a*.
Figure 21C:
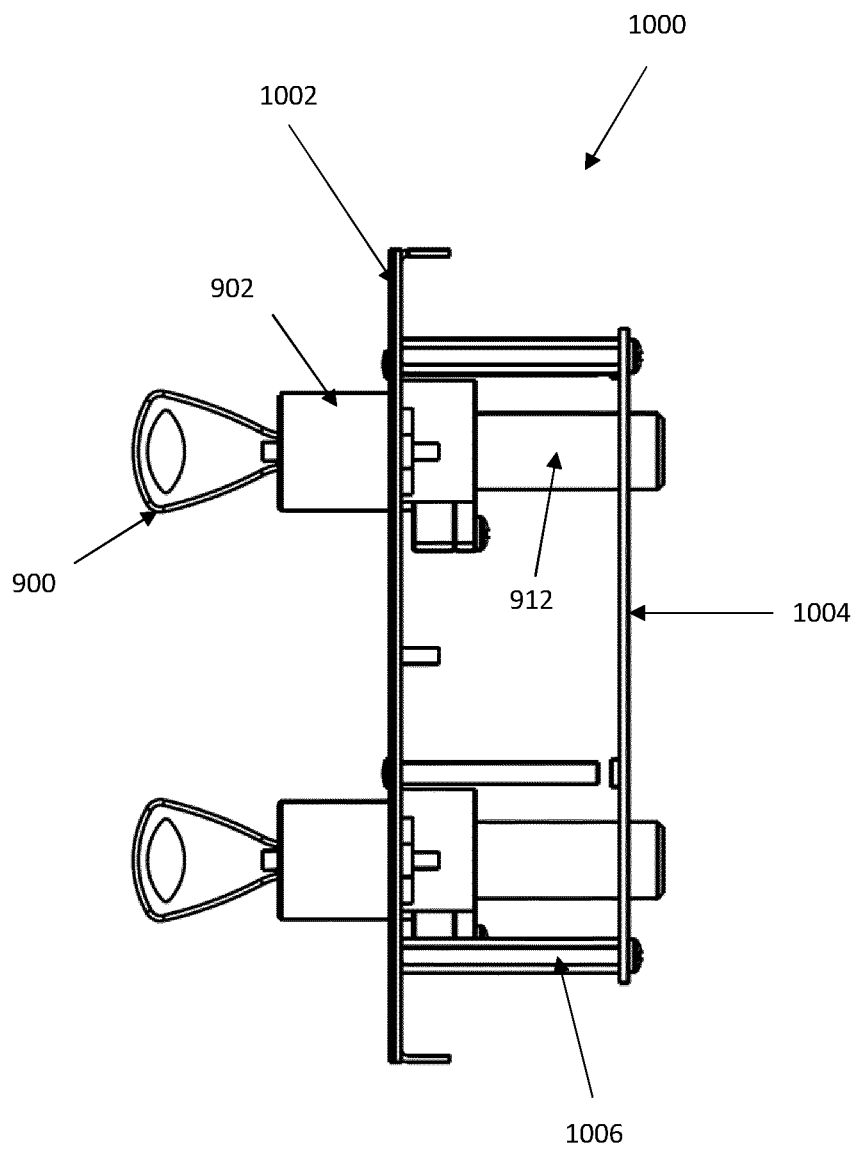
FIG. 21*c* is an end view of the assembly of FIG. 21*a*.

Referring to FIGS. 21a to 21c, a cabinet assembly 1000 is shown comprising a front plate 1002 and a PCB 1004 offset from the front plate by PCB supports 1006. The cabinet assembly 1000 comprises a plurality of receptacles 902 arranged in an offset grid pattern, each mounted in an opening on the front plate 1002 with the receptacle body 912 extending through a corresponding opening in the PCB 1004. Each receptacle 902 comprises a cylinder 908 configured to receive a specific key 900. The cylinder 908 are selected such that only the correct, corresponding, key can be (i) fully inserted and (ii) rotated in the cylinder to retain the key therein.

Referring to FIGS. 19b and 20b, it can be observed that movement of the plunger from the first to the second position moves the RFID tag 924 into the plane of the PCB 1004. The RFID tag is detected by an RF receiver coil on the PCB in the same manner as the previous embodiments, modulating the current in the coils and providing means for detecting the position of the RFID tag. In particular, whether the plunger is in the first or second position can be detected. It will be noted that the signal varies with insertion depth, such that the system can determine when the key 900 is fully inserted.

The cabinet assembly 1000 is provided in a locked cabinet, access to which is controlled.

It will be noted that other types of lock mechanism may be used (such as a pin tumbler lock mechanisms). Ultimately, the lock mechanisms must be configured such that an incorrect key is not fully insertable or rotatable.

Figure 22:
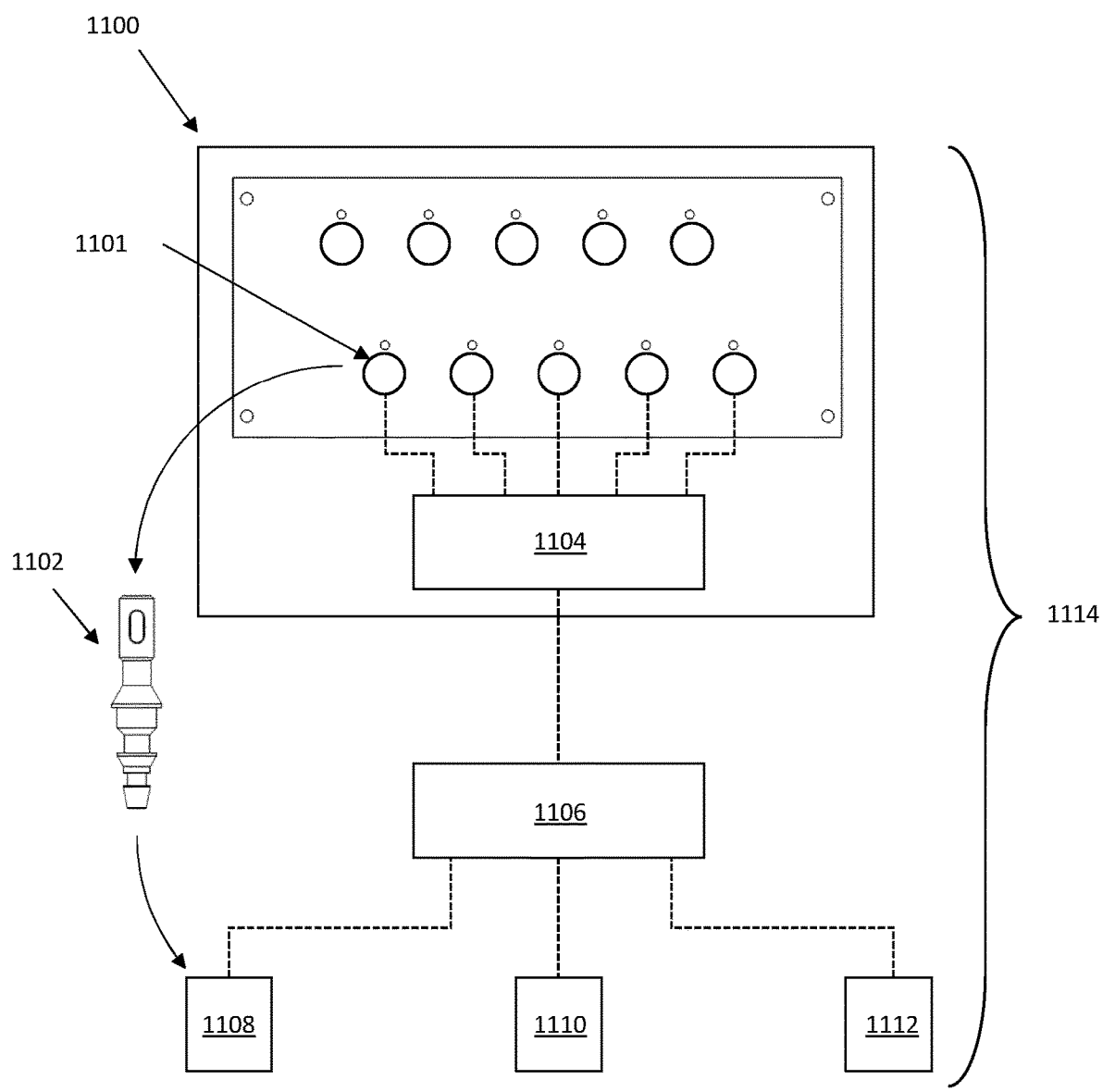
FIG. 22 is a schematic view of an access control system in accordance with the present invention.

FIG. 22 shows an access control system incorporating a further embodiment of the invention. The system comprises a plurality of receptacles 1101 and a fob management system 1100 having a microcontroller 1104 as described above, the system being capable of receiving and identifying fobs 1102. Each fob 1102 comprises an RFID microchip. The microchip provided is configured as a read/write microchip. In this embodiment, the microchip is modified with a first unique identifier (UID1) and a second unique identifier (UID2) that may be modified. UID1 and UID2 are recognisable at the system 1100 as described above.

The system further comprises a network switch 1106 and a plurality of access control readers 1108, 1110, 1112 each of which is configured to provide access to e.g. doors by controlling electronic locks.

The fob management system 1100 and the access control readers 1108, 1110, 1112 are connected to the network switch 1106 to form a network 1114.

Each fob 1102 can be used as an access control device (equivalent to a mechanical key) for the electronic lock systems. The readers 1108, 1110, 1112 are configured to recognise UID1 & UID and permit access according to an access database. Therefore the RF microchip has dual functionality-asset tracking within a storage system according to the present invention, but also access control.

In this embodiment, the RF receiver coils within the fob management system 1100, as well as detecting the presence of the RFID component and reading the UIDs, are also configured to write data to the RFID components, and in particular update or revise the UID2.

In such an embodiment, to increase security, the microchip within the fob may have its UID2 changed at predetermined intervals (e.g. every hour) when within the system 1110. The access control readers 1108, 1110, 1112 are also updated to recognise the modified UID via the network 1114, and this constantly cycling UID makes the system more secure.

In another embodiment, the UID may be altered each time the fob is inserted into/engaged with the receptacle 1101. In this case, the presence of the fob is detected as described in the embodiment above (with the RF coils) and the UID2 updated. Such a function allows the fob to be checked out and used a predetermined number of times.

In both cases, the cabinet is configured to update external systems (such as access control) with the updated UIDs, when the UIDs have been updated on the relevant fob. Such external systems will be programmed with the UID2 expiry time, and if the UID2 is not updated (with the new UID2 expiry time), the fob will automatically become redundant because its UID2 will have expired.

Therefore, if a fob is misplaced, unlike known access control systems, it will not grant access to a door it otherwise would have.

The access control system raises a flag or an alert to the system administrator on the associated web software if there was an attempt to use an expired fob.

The invention claimed is:

1. A system for storing a plurality of tangible assets, the system comprising:
   an RF component, wherein the RF component is associable with a tangible asset, and wherein the RF component has a unique identifier and is configured to receive a carrier signal and emit a modulated carrier signal, wherein modulation of the carrier signal is based on the unique identifier;
   an RF detection system, comprising:
      a plurality of RF coils, wherein each coil is arranged to emit a carrier signal and receive the modulated carrier signal emitted by the RF component;
      a processor in communication with each of the plurality of RF coils, wherein the processor is configured to:
         poll the plurality of RF coils by selectively allowing current to flow through one or more of the plurality of RF coils at a time; and,
         identify the RF component based on modulation of the carrier signal;
   wherein the RF component is a read/write RF component, and wherein the RF detection system is configured to write to the RF component via any of the plurality of RF coils;
   wherein the unique identifier of the RF component is a first unique identifier;
   wherein the RF component stores a second unique identifier;
   wherein the RF detection system is a first RF detection system; and,
   wherein the system for storing a plurality of tangible assets comprises a second RF detection system; and,
   wherein the second unique identifier is recognisable at the second RF detection system, networked to the system for storing a plurality of tangible assets, wherein the first RF detection system is configured to update the second unique identifier.

2. The system of claim 1, wherein the plurality of RF coils are arranged on a single printed circuit board.

3. The system of claim 1, wherein the processor is configured to poll the plurality of RF coils in a repeating sequence.

4. The system of claim 1, wherein each of the plurality of RF coils comprises between 50 and 60 turns.

5. The system of claim 1, wherein the plurality of RF coils are printed over 4 layers of a printed circuit board.

6. The system of claim 1, wherein the first RF detection system is triggered to update the second unique identifier upon identification.

7. The system of claim 6, wherein the updated second unique identifier is communicated to the second RF detection system.

8. The system of claim 1, wherein the first RF detection system is triggered to update the second unique identifier at a specific time.

9. The system of claim 1, comprising:
   a receptable associated with each of the plurality of RF coils, the RF coils configured to identify the RF component within the respective receptacle associated therewith;
   a location mechanism configured to locate the RF component at a predetermined insertion depth within the receptacle by exerting an insertion force on the RF component;
   wherein the controller is configured determine when the RF component is at, or within a predetermined tolerance of, the predetermined insertion depth.

10. The system of claim 9, wherein the RF component is a fob.

11. The system of claim 10, wherein:
    the location mechanism comprises at least one moveable component;
    the at least one moveable component is resiliently biased towards a predetermined position;
    initial insertion of the fob into the receptable causes movement of the at least one moveable component away from the predetermined position; and,
    wherein insertion of the fob to the predetermined insertion depth within the receptacle causes the at least one moveable component to return towards the predetermined position to locate the fob.

12. The system of claim 11, wherein the at least one moveable component bears against a tapered surface of the fob to cause movement of the at least one moveable component away from the predetermined position.

13. The system of claim 12, wherein the tapered surface of the fob terminates in a shoulder, such that upon location of the fob into the predetermined insertion depth, the at least one moveable component rides over the shoulder towards the predetermined position.

14. The system of claim 10, further comprising a solenoid lock, wherein the receptable is arranged to receive a pin of the solenoid lock, wherein the pin prevents the fob from being withdrawn from the fob receptacle.

15. The system of claim 1, comprising:
    a receptable associated with each of the plurality of RF coils, the RF coils configured to identify the RF component within the respective receptacle associated therewith;
    a location mechanism configured to locate the RF component at a predetermined insertion depth within the receptacle by exerting an insertion force on the RF component;
    a lock for locking the RF component in the receptacle;
    wherein the lock is arranged to lock the RF component in the receptacle when the RF component is at, or within a predetermined tolerance of, the predetermined insertion depth in the receptacle.

16. The system of claim 15, wherein the RF component is a fob.

17. The system of claim 16, wherein the at least one moveable component bears against a tapered surface of the fob to cause movement of the at least one moveable component away from the predetermined position.

18. The system of claim 17, wherein the tapered surface of the fob terminates in a shoulder, such that upon location of the fob into the predetermined insertion depth, the at least one moveable component rides over the shoulder towards the predetermined position.

19. The system of claim 1, wherein the processor is further configured to determine the distance between the RF component and one of the RF coils based on the peak amplitude of the modulated carrier signal.

* * * * *